(12) United States Patent
Najafi

(10) Patent No.: US 6,625,209 B1
(45) Date of Patent: Sep. 23, 2003

(54) SHORT SYNCHRONIZATION TIME DATA MODEM

(75) Inventor: Hamid Najafi, Los Altos Hills, CA (US)

(73) Assignee: CSI-Wireless, Inc., Milpitas, CA (US)

( * ) Notice: Subject to any disclaimer, the term of this patent is extended or adjusted under 35 U.S.C. 154(b) by 0 days.

(21) Appl. No.: 09/280,400

(22) Filed: Mar. 29, 1999

(51) Int. Cl.[7] .............................................. H04B 1/38
(52) U.S. Cl. ..................................................... 375/222
(58) Field of Search .............................. 375/219, 220, 375/222, 316, 356, 359, 373, 376, 375, 294, 327, 215; 370/278, 282; 455/427, 13.2, 13.1, 12.1, 265; 342/357.05, 357.09, 357.1, 457, 352

(56) References Cited

U.S. PATENT DOCUMENTS

| | | | | |
|---|---|---|---|---|
| 5,594,454 A | * | 1/1997 | Devereux et al. | 342/357 |
| 5,742,907 A | * | 4/1998 | Brown | 455/503 |
| 5,809,397 A | * | 9/1998 | Harthcock et al. | 455/13.2 |
| 5,815,538 A | * | 9/1998 | Grell et al. | 375/356 |
| 5,861,842 A | * | 1/1999 | Hitch et al. | 342/357.15 |
| 5,864,592 A | * | 1/1999 | Itri | 375/220 |
| 5,878,221 A | * | 3/1999 | Szkopek et al. | 370/488 |
| 5,973,643 A | * | 10/1999 | Hawkes et al. | 342/457 |
| 6,011,977 A | * | 1/2000 | Brown et al. | 455/503 |
| 6,041,222 A | * | 3/2000 | Horton et al. | 455/255 |
| 6,091,932 A | * | 7/2000 | Langlais | 725/111 |
| 6,131,067 A | * | 10/2000 | Girerd et al. | 701/213 |
| 6,137,839 A | * | 10/2000 | Mannering et al. | 370/210 |
| 6,151,479 A | * | 11/2000 | Kummer | 327/115 |
| 6,163,294 A | * | 12/2000 | Talbot | 342/357.06 |
| 6,208,290 B1 | * | 3/2001 | Krasner | 342/357.05 |
| 6,377,647 B1 | * | 4/2002 | Kaku et al. | 370/505 |
| 6,448,861 B2 | * | 9/2002 | Kawada et al. | 327/156 |

* cited by examiner

*Primary Examiner*—Chi Pham
*Assistant Examiner*—Emmanuel Bayard
(74) *Attorney, Agent, or Firm*—Fernandez & Associates, LLP

(57) ABSTRACT

A short synchronization time modem comprising a GPS receiver for receiving a broadcasted signal comprising a high precision clock. When a first short synchronization data modem communicates with a second, a PLL in each data modem synchronizes its own local clock to the same high precision clock derived from the same received broadcasted signal. The modems connect for the first time using one of many clock recovery schemes known to the modem designers. Once they disconnect, the modems keep their clocks synchronized using a local GPS receiver and the received broadcasted signal. This prevents the local clock of the modems from drifting, which significantly reduces the time period the modems need to synchronize the next time they connect.

9 Claims, 8 Drawing Sheets

SHORT SYNCHRONIZATION TIME DATA MODEM

FIELD OF INVENTION

Invention relates to data modems, and more particularly to data modem clock synchronization.

BACKGROUND OF INVENTION

Data modems are commonly used to send and receive data via telephone lines or other communications facilities. Each modem has a local clock, which is free running, not synchronized to any other timing source. When two modems first connect, they first must synchronize their local clocks to ensure reliable transfer of data communication. The modems use a variety of clock recovery schemes, such as phase-locked loop circuits, to lock to opposing modem clock. This type of scheme requires a period of time when the modems send certain known sequences of signals, such as alternate ones and zeros and scrambled ones, to allow their respective clock recovery circuits to phase lock to the modem clock at the other end. After this clock synchronization period, the modems begin sending actual data.

In a typical modem connection, clock synchronization time is insignificant when compared to the time it takes for the two modems to transfer data. For typical applications, clock synchronization time is in the range of a few seconds or less, while the actual data communication time is in the order of several minutes or perhaps several hours. However, in applications where data transfer is short and requires only a few seconds or less, then clock synchronization time becomes a significant overhead, particularly when typical synchronization takes as much time, or more, than time to send the actual data. An example of such applications is mobile asset tracking, where an asset is equipped with a GPS receiver to detect its own location, and a wireless modem to report its location to a central monitoring station. Data required to report asset location information, such as latitude and longitude data, is very small (less than 100 bytes), and thus correspondingly involves very little data transmission.

SUMMARY OF INVENTION

This invention provides data modems having very fast clock synchronization, by having the modem receiver clock synchronize to a precise clock signal derived from a received broadcasted signal comprising a very high precision clock, such as an UTC clock from a global positioning satellite (GPS). The modems connect for the first time using a standard training procedure. Thereafter, once on-line communication between the modems has been disconnected, the modems maintain their local clock synchronization to the GPS's UTC clock provided to a local GPS receiver. Since GPS receivers at both end of the modem terminals are synchronized to the same received broadcasted signal comprising the same high precision clock from the GPS, this prevents the local modem clocks from drifting apart, thereby significantly reduces the modem synchronization time, or the training time at the next modem connect time.

The GPS receiver provides dual functions of producing a location fix, as well as providing precise timing to a wireless modem. And since the modem at the central monitoring station is also equipped with a GPS receiver, the central modem maintains synchronization with the remote modem using the same precise clock available from its GPS receiver. Because the GPS constellation consists of 24 orbiting satellites that continuously broadcast signals, the signal processor of GPS receiver use these broadcasted signals to determine its own latitude and longitude position. And since each GPS satellite is also equipped with a highly stable Cesium clock, the GPS receivers use this precise clocks to correct their local clock, which is not as stable as the GPS atomic clocks.

Typically, the GPS receivers generate a clock that is locked to the GPS atomic clock and operates at 1 pulse per second (PPS) rate. The accuracy of this clock is bounded by the Selective Availability (SA) which limits the position accuracy of a non-differential GPS receiver to about 100 meters which translates to a clock error of about 333 nanoseconds. This error, when compared to the bit period, and bit clock, of a voice-band modem, is insignificant.

DETAILED DESCRIPTION OF PREFERRED EMBODIMENT(S)

Figure 1:
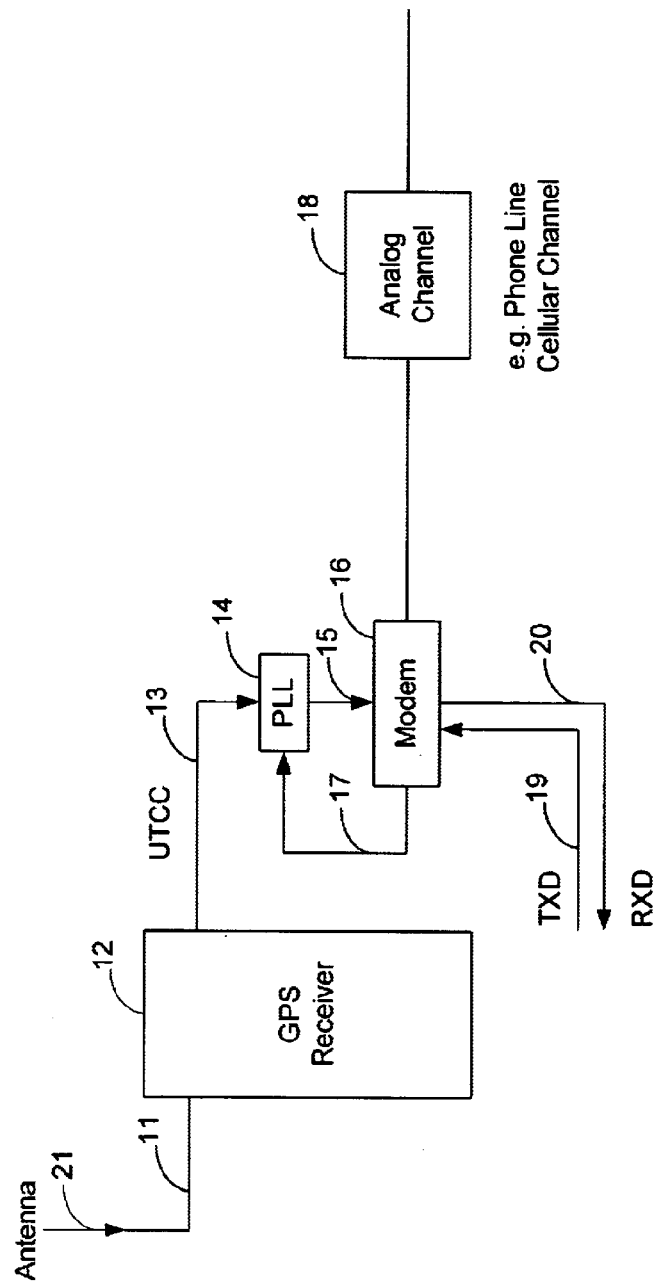
FIG. 1 shows a block diagram of a short synchronization time data modem system in accordance to the principles of this present invention.

In a preferred modem system application environment contemplated, a first data modem system communicates with one or more remote data modem systems, wherein each data modem system comprises a short synchronization time data modem system 10 of FIG. 1 provided in accordance to the principles of this invention. The first modem system 10 communicating with one or more modem systems 10 remotely located to the first modem system 10, such as located at a central monitoring station, maintains synchronization with that one or more remotely located modem system 10 using a precise broadcasted clock available to each GPS receiver 12 provided via incoming broadcasted signal 11. FIG. 1 illustrates a block diagram of the preferred embodiment of a short synchronization time data modem system 10 comprising a Global Positioning Satellite (GPS) receiver 12, a Phase-Locked Loop Circuit (PLL) 14, and a modem circuit 16. GPS receiver 12 comprises a typical RF front-end circuit coupled to a signal processor via a demodulator (not shown), wherein the RF front-end operates at a pre-selected frequency to receive incoming broadcasted signals 11 via antenna 21. In the preferred embodiment, the RF front-end of GPS receiver 12 operates at a GPS frequency of 1575.42 MHz to receive GPS broadcasted signal as incoming signal 11 via antenna 21. During initial modem clock synchronization, GPS receiver 12 provides to PLL 14 a digitized clock signal 13 (UTCC), such as an Universal Time Coordinate (UTC) signal that is phase locked to the atomic clock of the Global Positioning derived from incoming receiver signal 11 for local clock synchronization.

The signal processor of GPS receiver 12 then processes incoming broadcasted signal 11 comprising GPS signals received from GPS satellites to derive positional data (i.e., latitude, longitude), and the Universal Time Coordinate signal (UTC). Since the GPS constellation comprises 24 orbiting satellites that continuously broadcast GPS signals, the signal processor of GPS receiver 12 can thereby use broadcasted GPS signals to determine its own latitude and longitude position. Moreover, because each GPS satellite is also equipped with a highly precise and stable Cesium clock, each GPS receiver 12 in essence simultaneously also receives this precise clock via incoming broadcasted signal 11. As described herein, incoming receiver signal 11 preferably comprises a GPS broadcasted signal. However, it is envisioned that any broadcasted, high precision clock, such as the ("WWT") atomic clock in Boulder, Colo., or the Greenwich clock, located in the United Kingdom, received via antenna 21 as incoming receiver signal 11 can be used by GPS receiver 12 to generate digitized UTCC clock 13 for local clock synchronization. Thus, in accordance with the principles of this invention, a first modem system 10 communicating with one or more modem systems 10 remotely located to the first modem system 10, such as located at a central monitoring station, maintains synchronization with that one or more remotely located modem system 10 using the same precise broadcasted clock available to each GPS receiver 12 provided via incoming broadcasted signal 11.

As illustrated in FIG. 1, during initial modem clock synchronization, GPS receiver 12 provides to PLL 14 digitized UTC signal 13 (UTCC) derived from incoming broadcasted signal 11 for local clock synchronization. As will be described later in further detail with reference to FIG. 3, PLL 14 receives UTCC 13 and phase-locks a local clock 17 (CCLK) to UTCC to generate a modem clock 15 (MCLK) for clocking data transmission. MCLK is then provided to modem circuit 16 to clock data transmission. Modem 16 comprises a typical modem circuitry having a modulator section which converts a digital stream of transmit data into an analog signal suitable for transmission over an analog channel 18 such as a phone line or a cellular phone channel. Modem circuit 16 also comprises a demodulator circuit, which receives an analog signal over an analog channel and converts it to a digital stream of received data.

A typical data communication is between two modems that are remotely located to one another. For convenience in describing the data communication between a first and a second short synchronization time data modem system 10, the first data modem system will be referred to as terminal A and the second data modem system referred as terminal B. Thus, for example, when terminal A calls terminal B over an analog channel 18, such as via a phone line or a cellular channel, modem circuit 16 of terminal B answers the call. Terminal A and B then each executes an initial, predetermined training sequence (or "handshake"), such as provided by the ITU V.22 modem standard protocol illustrated in FIGS. 2A–2B, which consists of terminal B sending an acknowledging response tone followed by a fixed pattern of data, i.e., a sequence of "ones" and "zeroes". In response to receiving terminal B's sequence, terminal A sends terminal B another known signal pattern. This "handshaking" continues in varying lengths and complexity depending on the modem specifications until the modem receiver of terminal B is locked to terminal A and vice versa. The term "locked" means herein that each modem clock is synchronized to the other, the equalizers in both modems are trained, and the modems' carriers are phase locked to each other. Once the modem clocks are mutually locked, or synchronized to the other, then the two modems are ready to transmit or receive data.

Figure 3:
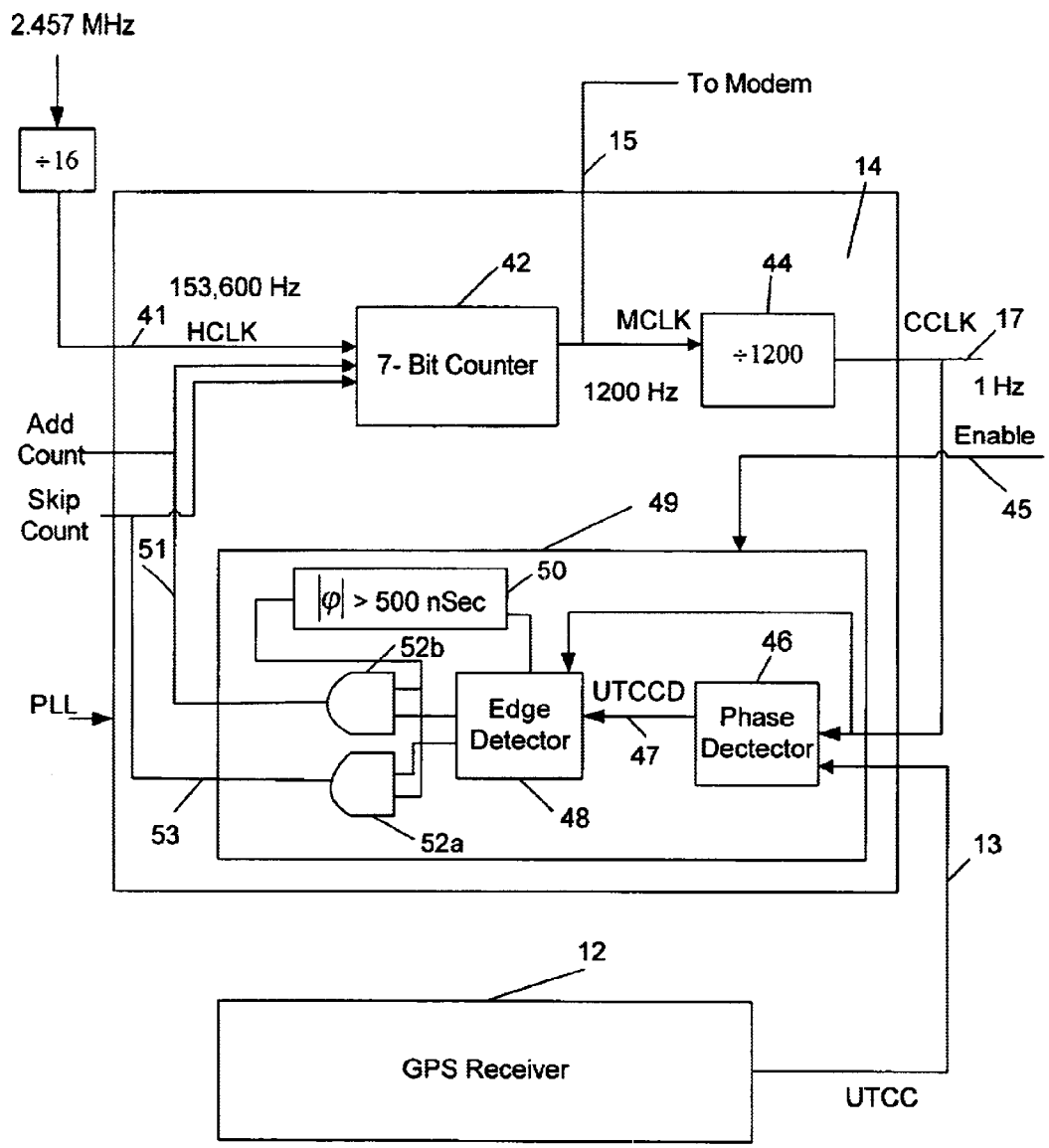
FIG. 3 shows a more detailed block diagram of the PLL of FIG. 1.

FIG. 3 illustrates a more detailed embodiment of PLL circuit 14 of FIG. 1. The typical operating frequency of a GPS clock 13 (UTCC) is at 1 Hz, which is much lower than the clock frequency needed for modem operation. PLL 14 therefore generates a higher frequency modem clock 15 (MCLK) to clock modem 16. MCLK 15 comprises a frequency that is a multiple N of UTCC frequency. MCLK 15 is generated using a higher frequency clock 41 (HCLK) generated from a crystal clock oscillator operating at, for example, 2.457 MHz. HCLK 41 is selected initially to be 128 times the desired MCLK frequency. HCLK 41 is then divided down by a 7-bit counter 42 to generate MCLK 15. MCLK 15 can be subsequently speeded up by adding a count to 7-bit Counter 42, or slowed down by reducing count to Counter 42 depending on control logic signals Add Count 51 and Skip Count signal 53 received from edge detector 48. MCLK 15 is also divided by a multiple N (i.e., 1200) to generate a local modem clock 17 (CCLK), which at 1 Hz is at the same frequency, and therefore in synchronization to GPS clock UTCC 13.

Figure 4:
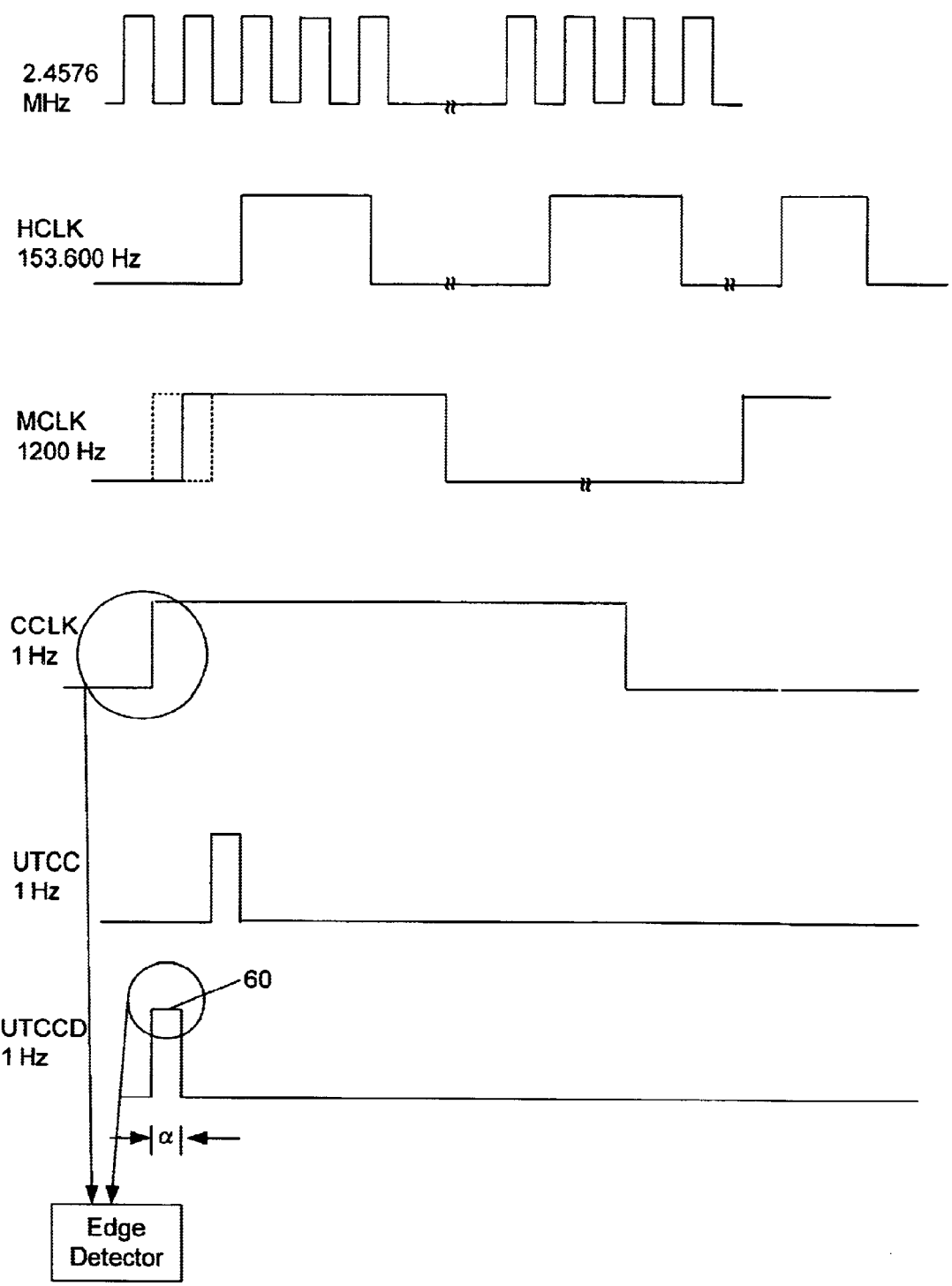
FIG. 4 illustrates a sample timing relationship of signals shown in PLL of FIG. 3.

FIG. 4 illustrates a typical phase offset 60 (α) between CCLK 17 and UTCCD 47 clock signals that is detected by phase detector circuit 46 (see FIG. 3) prior to the modem connection between terminals A and B being terminated. PLL 14 phase locks CCLK 17 to UTCCD 47 such that the α phase offset between CCLK and UTCC remains fixed. Thus, since both modem system A and B each comprises a short synchronization time modem system 10, modem 16 at each terminal A and B locks its CCLK 17 to UTCCD signal 47 using a phase detection and adjustment circuit 49 (FIG. 3) of PLL 14 to keep local CCLK 17 in each system from drifting. As shown in FIG. 3, phase detector 46 generates UTCCD 47, which comprises UTCC 13 delayed by phase offset α. PLL 14 also comprises an edge detector 48 that compares the rising edge of CCLK 17 against that of UTCCD 47. When CCLK 17 rising edge lags behind that of UTCCD 47 by α (i.e., as illustrated in FIG. 4), add count signal 53 is activated and provided to 7-bit counter 42 to reduce count and shorten CCLK 17 by one period to bring CCLK closer in-phase with UTCCD 47. On the other hand, if CCLK 17 rising edge is ahead of UTCCD 47, then PLL 14 issues a reduce count signal 51 to 7-bit counter 42 to increase count and lengthen CCLK 17 by one period to bring CCLK closer to being in-phase with UTCCD 47. This PLL operation keeps MCLK 15 and thus also CCLK 17 in phase with GPS clock UTCCD 47, which is locked to UTCC 13 as received by GPS receiver 12. Accordingly, terminal A and B maintain synchronization even after they terminate their connection.

UTCC 13 generated by a GPS receiver 12 is accurate within ±500 nsec. Thus in the preferred embodiment, edge detectors 48 skips a count to slow down, and adds a count to "speed up" CCLK only when the edge offset magnitude is greater than 500 nsec to filter out this jitter. Thus, filter 50 of FIG. 3 is coupled to edge detector circuit 48 to detect if the magnitude of UTCCD 47 is greater than 500 nsec, then add count signal 53 and reduce count signal 51 are activated as appropriate and provided to counter 42 to adjust MCLK 15 and local CCLK 17.

Figure 5A:
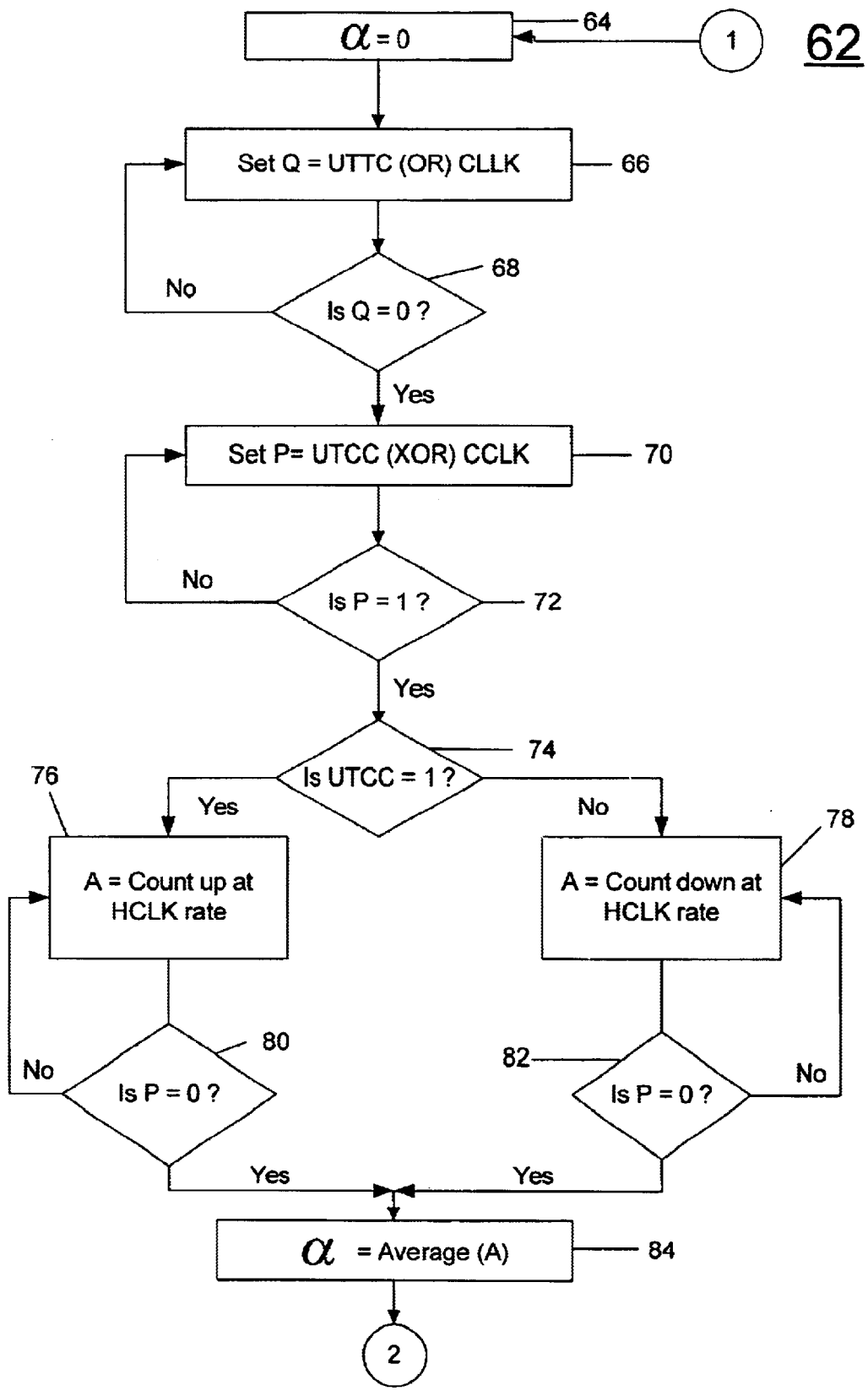
FIG. 5A illustrates a flow chart of the operational steps of the PLL of FIG. 3.
Figure 5B:
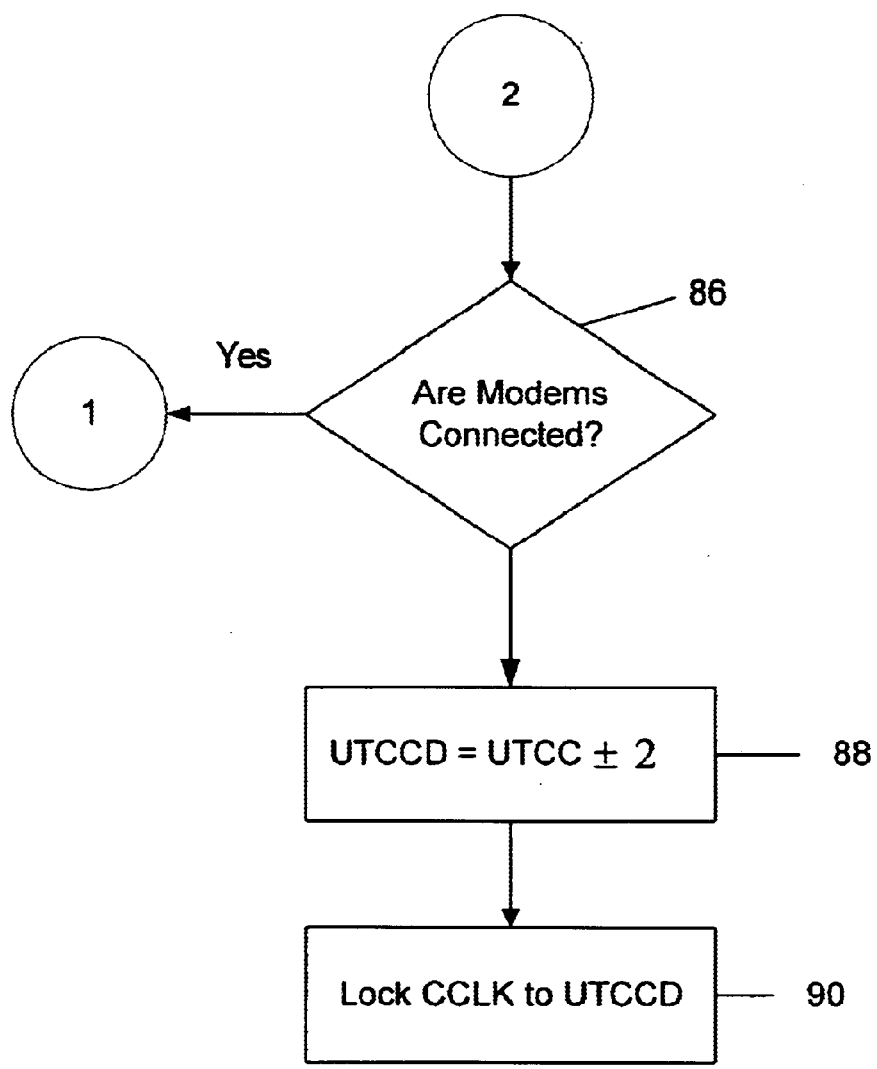
FIG. 5B shows a continuation of FIG. 5A flow chart describing the operational steps of the PLL of FIG. 3.

FIGS. 5A and 5B illustrates an embodiment of a phase detection and adjustment process 62 as described relative to FIGS. 3 and 4 above. In PLL operation 62, edge detector 48 first initializes α=0 in step 64 and sets Q=(UTCC) OR (CCLK) in step 66. Then in step 68, edge detector 48 detects whether Q=0, i.e., detects when UTCC=CCLK=0, and then to detect when one of these signals first transitions to a logic value of 1. If either UTCC or CCLK=1, then phase detection and adjustment process 62 returns to step 66 to continue detect when Q=0. Once Q=0, then in step 70, set P=(UTCC) XOR (CCLK) to thereby detect in step 72 when only one of two clocks, UTCC or CCLK is equivalent to 1, and to continue to return to step 70 to continue to detect whether the two signals are the same (i.e., detect when P=0). Once P=1, step 74 detects whether UTCC=1. If not, in step 78, variable A is set to A=−(HCLK rate), i.e., it is decremented at the HCLK rate, and then again in step 82, detect whether P=1, and continue to return to step 78 to count down at HCLK rate, until P=0 in step 82. Similarly, back in step 74, if UTCC=1, then in step 76, A=+(HCLK rate) and step 80 detects whether P=0. If not, return to step 76 to continue to count up at HCLK rate until, P=0 in step 80. Once P=0, then in step 84, C=Average (A). Then in step 86, detect whether both modem terminals are still connected, if yes, return back to step 62 to continue updating α offset, otherwise in step 88, set UTCCD=(UTCC−α). Then in step 90, adjust and lock CCLK to UTCCD accordingly using α to control add count and reduce count signals 53 and 51, respectively.

Figure 2A:
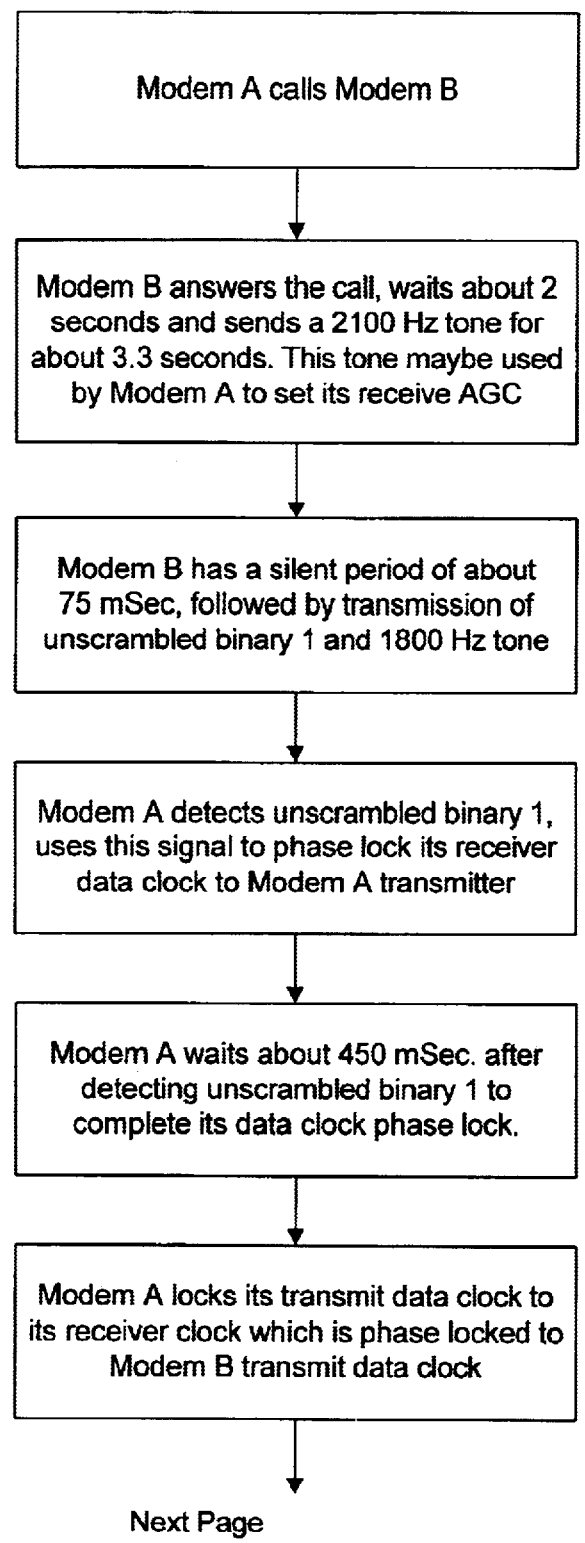
FIG. 2A illustrates a standard modem synchronization protocol provided by ITU V.22 standard.
Figure 2B:
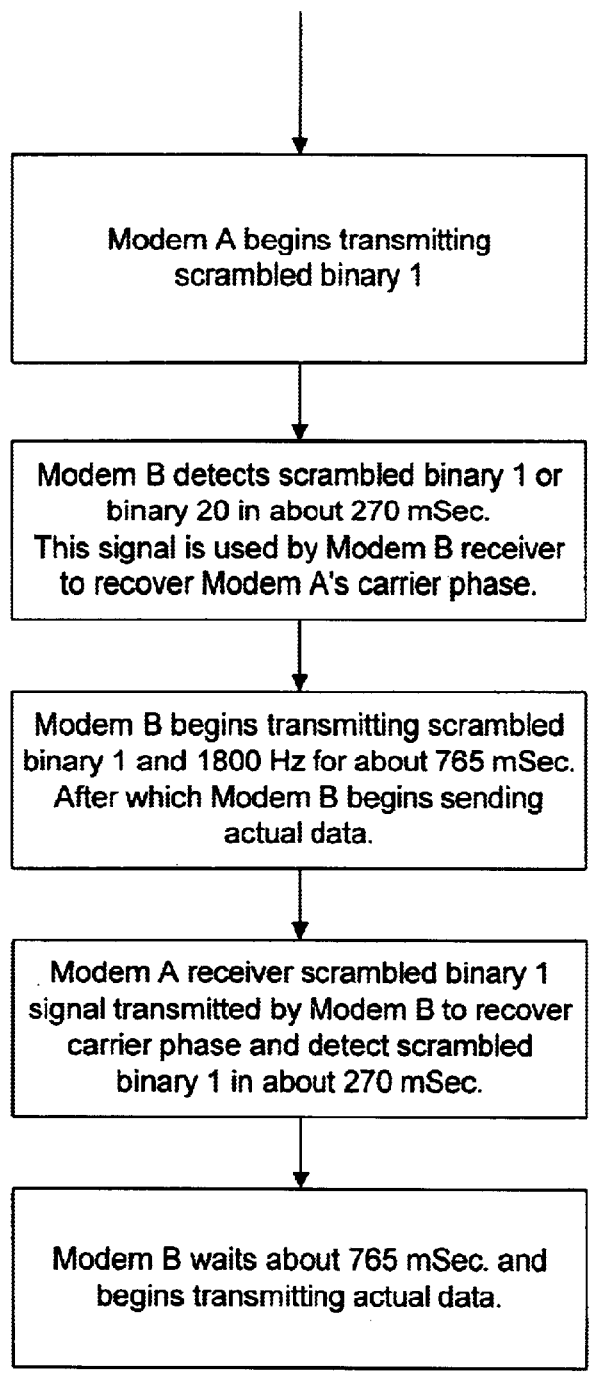
FIG. 2B shows a continuation of FIG. 2A diagram illustrating standard modem synchronization protocol provided by ITU V.22 standard.
Figure 6:
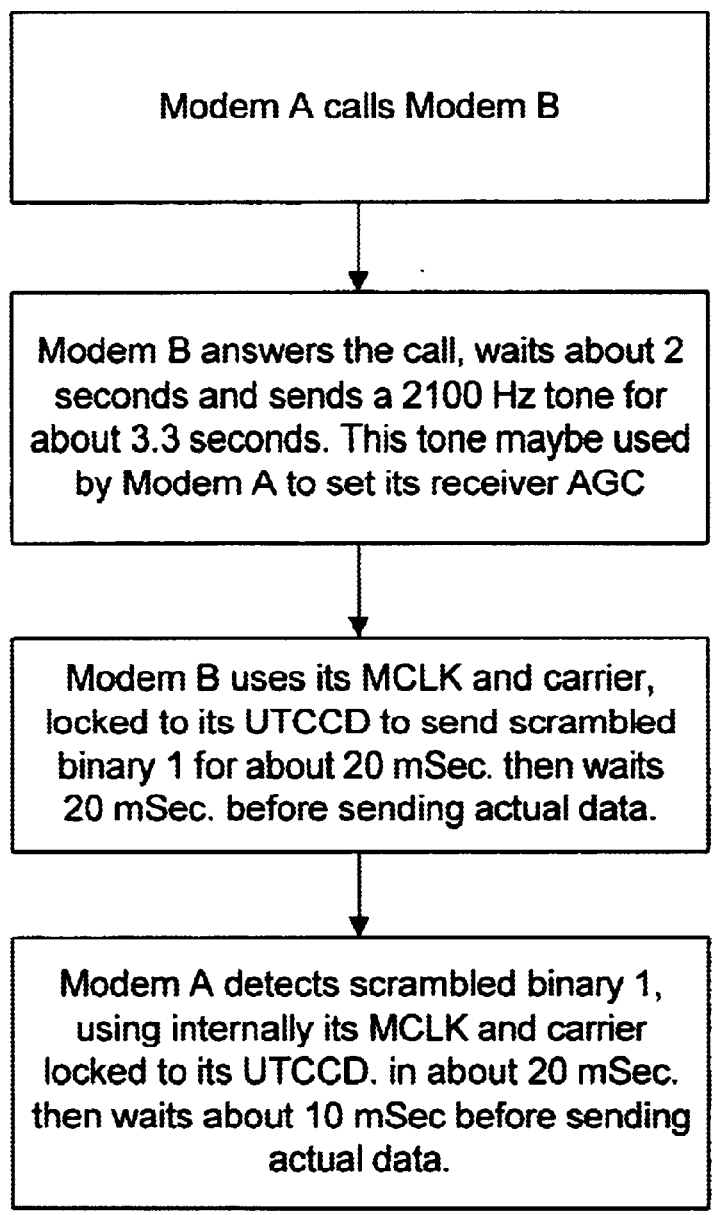
FIG. 6 illustrates a short training synchronization sequence for maintaining synchronization in accordance with the principles of this invention.

Following the initial modem connection and training, a subsequent modem communication between modem terminals A and B bypasses the lengthy training sequence such as the V.22 sequence of FIGS. 2A and 2b. Instead, a very short, i.e., a 14 bit-sequence comprising a known pattern can be used to ensure synchronization between the modems prior to commencing data transmission, using such as the short handshake sequence shown in FIG. 6. This thus significantly reduces the training time and allows data communications to begin within a few milliseconds following connect time.

In some applications, the connection between point A and point B is not terminated after a set of data bits are transmitted. The communication channel is used to send other signals, such as voice signals, and in between these signals the modems need to frequently transmit data. A typical application is when a voice call is made and between the pauses in voice a burst of data is transmitted, for instance, to report the location of the caller. In these applications, the modems can maintain clock synchronization while their connection is interrupted to transmit voice, using the method described above, and therefore can immediately send their data burst without having to send any synchronization pattern, therefore bypassing the entire handshake sequence, before each transmission. This can be achieved if channel characteristics do not change, which is true in most cases when the connection is not terminated.

In applications where the location information is not needed, such as fixed terminal application, GPS receiver 12 can be simplified to only retrieve timing data from GPS system and thus generates UTC data only. This reduces the functionality required of the GPS receivers 12, thereby reducing cost.

This invention thus provides data modems having very fast clock synchronization, by having the modem receiver clock synchronize to a precise clock signal derived from an UTC clock received from a global positioning satellite (GPS) or other similar high precision clock broadcasts. The modems connect for the first time using standard training procedure, such as sequence 50, shown below. Thereafter, when the modems disconnect, the modems maintain their local clock synchronization to the GPS's UTC clock 13 using a shortened training sequence illustrated in FIG. 6.

Since GPS receivers at both end of the modem connection are synchronized to a highly precise, broadcasted clock received via incoming signal 11 and provided to GPS receiver 12, this prevents the local modem clocks from drifting apart, thus significantly reducing the time period the modems need to synchronize, or train, the next time they connect.

It is further contemplated as within the scope and principle of this invention to use any highly precise clock that is commonly accessible to either modem terminal receiver as UTCC clock signal for synchronization, and thus not limited to a GPS clock signal.

Foregoing described embodiments of the invention are provided as illustrations and descriptions. They are not intended to limit the invention to precise form described. In particular, Applicant(s) contemplate that functional implementation of invention described herein may be implemented equivalently in hardware, software, firmware, and/or other available functional components or building blocks.

Other variations and embodiments are possible in light of above teachings, and it is thus intended that the scope of invention not be limited by this Detailed Description, but rather by Claims following.

What is claimed is:

1. A short synchronization time data modem system, wherein the data modem system comprises a first data modem terminal (terminal A) and a second data modem terminal (terminal B), comprising:

a terminal A further comprising a first antenna for receiving an incoming broadcasted signal comprising a high precision, broadcasted clock signal;

a first modem receiver coupled to the first antenna to receive the incoming broadcasted signal and generating in response a corresponding first digital synchronization clock signal (UTCC1);

a first PLL, the first PLL coupled to the first modem receiver to receive UTCC1 and generating an output first modem clock signal (MCLK1) having a frequency comprising a multiple N of a first locally generated clock signal (CCLK1);

a first phase detector circuit to detect a first phase difference (α1) between CCLK1 and UTCC1, and activating in response to the detected first phase difference one or more phase control signals provided as input control to a first counter in the first modem receiver for phase adjustment of MCLK1 relative to a detected phase of UTCC1;

a terminal B further comprising:

a second antenna for receiving an incoming broadcasted signal comprising a high precision, broadcasted clock signal;

a second modem receiver coupled to the second antenna to receive the incoming broadcasted signal and generating in response a corresponding second digital synchronization clock signal (UTCC2); and a second PLL, the second PLL coupled to the second modem receiver to receive UTCC2 and generating an output second modem clock signal (MCLK2) having a frequency comprising a multiple N of a second locally generated clock signal (CCLK2);

wherein the second modem answering a subsequent call from a first modem and waiting m number of seconds before sending a 2100 Hz signal for about 3.3 sec while synchronizing the MCLK1 in the first modem to an UTCCD1 signal derived from UTCC1; the first modem transmitting a binary sequence to the second modem, the first modem waiting y number of seconds prior to transmitting actual data to the second modem, the second modem detecting the set of binary sequence with a second modem clock MCLK2 in the second modem, then waiting z number of second prior to actual data transmission.

2. The data modem system of claim 1 wherein the high precision, broadcasted clock signal is a GPS clock signal.

3. A short synchronization time data modem method comprising:

receiving by a first modem receiver a high precision, broadcasted clock signal and generating a corresponding first digital synchronization clock (UTCC1);

generating a first local clock signal (CCLK1) in the first modem receiver having the same frequency as UTCC1 and generating a first modem clock (MCLK1) at a frequency comprising a multiple N of the first local clock; and detecting a phase difference ($\alpha 1$) between CCLK1 and UTCC1 and providing in response to the detected first phase difference $\alpha 1$ one or more phase control signals to a first counter in the first modem receiver to provide synchronization of phase between MCLK1 and UTCC1;

initially connecting to a second modem receiver using a standard training procedure;

answering by the second modem a subsequent call from a first modem and waiting m number of seconds before sending a 2100 Hz signal for about 3. 3 sec;

synchronizing the MCLK1 in the first modem to an UTCCD1 signal derived from UTCC1;

transmitting from the first modem to a second modem a set of binary sequence;

waiting y number of seconds prior to transmitting actual data from the first modem to the second modem; and detecting by the second modem the set of binary sequence with a second modem clock MCLK2 in the second modem, then waiting z number of second prior to actual data transmission.

4. The short synchronization time data modem method of claim 3 wherein the high precision broadcasted clock signal comprises a GPS clock signal.

5. The short synchronization time data modem method of claim 3 further comprising receiving a location data for determining a physical location of the first modem receiver.

6. The short synchronization time data modem method of claim 3 further comprising executing a shortened training procedure in a subsequent modem connection.

7. The short synchronization time data modem method of claim 3 wherein the step of detecting a phase difference, comprises the steps of:

detecting initially when UTCC1=CCLK1=0; and detecting when UTCC1≠CCLK, and activating either a counter adjust up signal or a counter adjust down signal in response to detecting whether UTCC=1.

8. The short synchronization time data modem method of claim 3 further comprising:

providing multiple data transmissions; and providing a data burst transmission in between the multiple data transmissions.

9. The short synchronization time data modem method of claim 3 wherein the multiple data transmissions comprise voice data.

* * * * *